3,651,079
1-ARYL-5-HYDROXYALKYL-HYDANTOINS
Joseph A. Skorcz, Milwaukee, and John T. Suh, Mequon,
Wis., assignors to Colgate-Palmolive Company, New
York, N.Y.
No Drawing. Filed Nov. 25, 1968, Ser. No. 778,750
Int. Cl. C07d 49/32
U.S. Cl. 260—309.5                          7 Claims

ABSTRACT OF THE DISCLOSURE

The compounds are 1-aryl-5-hydroxyalkyl-hydantoins which are useful as central nervous system affecting agents and as intermediates in the preparation of pickling agents, moth-proofing agents and wood preservatives. Representative of the compounds disclosed are 5-hydroxymethyl-1-(2-methoxy-4-nitrophenyl) - 5 - methylhydantoin, 5-acetoxymethyl - 1 - (2-methoxy-4-nitrophenyl)-5-methylhydantoin, 5 - acetoxymethyl - 1 - (2-methoxy-4-aminophenyl)-3,5-dimethylhydantoin hydrochloride and 5-hydroxymethyl - 1 - (2-methoxy - 4 - aminophenyl)-5-methylhydantoin hydrochloride.

DETAILED DESCRIPTION

The novel compounds of the present invention have the following formula

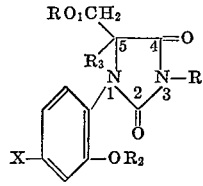

wherein X is nitro or $NH_2$, R is hydrogen or a lower alkyl containing 1 to 4 carbon atoms such as methyl, ethyl, propyl, isopropyl and butyl, a cycloalkyl of 3 to 7 carbon atoms such as cyclopropyl, cyclohexyl and cyclopentyl, a cycloalkyl-lower alkyl in which the cycloalkyl portion contains 3 to 7 carbon atoms such as cyclopropylmethyl, cyclohexylmethyl and an aralkyl of 7 to 13 carbon atoms, especially a phenyl-lower alkyl such as benzyl, phenethyl and phenylisopropyl, $R_1$ is hydrogen or an acyl group such as acetyl, benzoyl and benzenesulfonyl and carbamoyl, and $R_2$ and $R_3$ are a lower alkyl of 1 to 4 carbon atoms.

The compounds of the present invention may be conveniently prepared by employing as the basic starting material a ketone of the formula

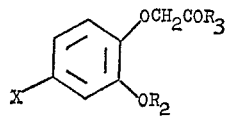

in which $R_2$, $R_3$ and X are as previously defined and do not interfere with or partake in the reaction.

Representative of the ketones that may be employed as starting materials are the following:

1-(2-methoxy-4-nitrophenoxy)-2-propanone,
1-(2-methoxy-4-nitrophenoxy)-2-butanone,
1-(2-ethoxy-4-nitrophenoxy)-2-propanone,
1-(2-propoxy-4-nitrophenoxy)-2-propanone, and
1-(2-isopropoxy-4-nitrophenoxy)-2-propanone.

In the preferred method of preparation the 1-(2-methoxy-4-nitrophenoxy)-2-propanone is dissolved in an aqueous alcohol solution and reacted with potassium cyanide and ammonium carbonate under reflux conditions for approximately 10 to 30 hours. The reaction mixture is concentrated under vacuum, diluted with water, acidified with concentrated hydrochloric acid to isolate a yellow solid. The solid is stirred with sodium hydroxide solution, and the insoluble solid is dissolved in warm water followed by acidification to yield the desired 5-hydroxymethyl-1-(2-alkoxy-4-nitrophenyl) - 5 - methylhydantoin. The reaction mixture also yields 5-(2-alkoxy-4-nitrophenoxy)methyl-5-methylhydantoin as a yellow powder. The latter compound is also readily obtained by terminating the above described reaction after approximately six hours under reflux conditions.

The 5-(2-alkoxy-4-nitrophenoxy)methyl - 5 - methylhydantoin can also be used to prepare the previously described 5-hydroxymethyl compound by treating the 5-(2-alkoxy-4-nitrophenoxy)methyl-5-hydantoin with ammonium carbonate and potassium cyanide in a 50% aqueous ethanol solution under reflux conditions for approximately 24 hours. The reaction mixture is concentrated, diluted with water and acidified to yield a solid. The ethanol insoluble portion of the solid is stirred with dilute sodium hydroxide solution and the base insoluble material is separated by filtration. This insoluble material is dissolved in water, acidified, filtered, and dried to give 5-hydroxymethyl-1-(2-alkoxy-4-(nitrophenyl) - 5 - methylhydantoin.

The compound 5-hydroxymethyl-1-(2-alkoxy-4-nitrophenoxy)methyl-5-methylhydantoin can be reacted with acetyl chloride in a solution of the carbinol in pyridine to form the corresponding acetyl derivative.

The corresponding compounds in which X is amino are readily prepared by suspending the nitro compound in acidic ethanol and subjecting the compound to hydrogenation conditions in the presence of a palladium on carbon catalyst.

The described process may be illustrated as follows:

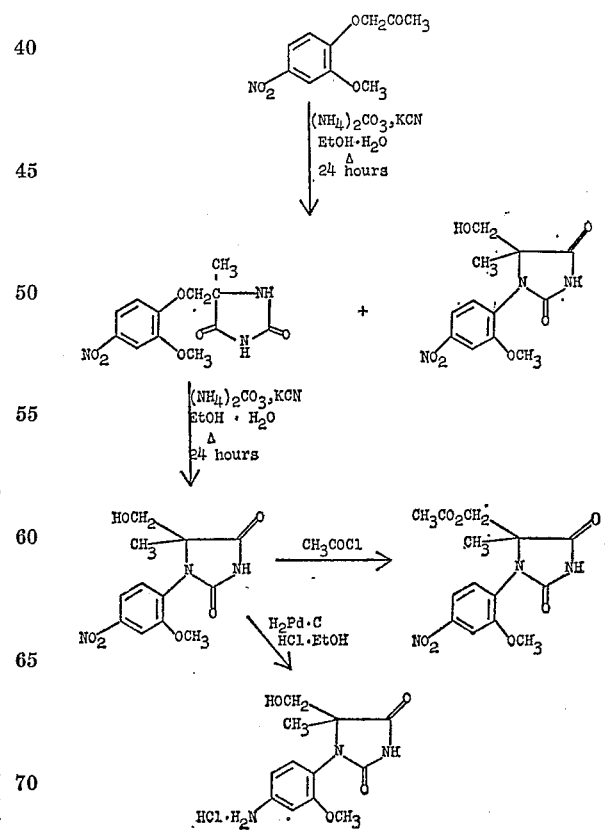

Representative of the compounds which may be prepared by the above described process are the following:

5-hydroxymethyl-1-(2-methoxy-4-nitrophenyl)-5-methylhydantoin,
5-(2-methoxy-4-nitrophenoxy)methyl-5-methylhydantoin,
5-acetoxymethyl-1-(2-methoxy-4-nitrophenyl)-5-methylhydantoin,
5-hydroxymethyl-1-(2-methoxy-4-aminophenyl)-5-methylhydantoin,
5-hydroxymethyl-1-(2-ethoxy-4-aminophenyl)-5-methylhydantoin,
5-acetoxymethyl-1-(2-methoxy-4-aminophenyl)-5-methylhydantoin,
5-dimethylcarbamyloxy-methyl-1-(2-methoxy-4-aminophenyl)-5-methylhydantoin, and
5-benzoyloxymethyl-1-(2-methoxy-4-aminophenyl)-5-methylhydantoin.

The compounds in which R is other than hydrogen may be readily prepared by known techniques such as direct alkylation of the corresponding compound in which R is hydrogen. The compounds in which R is methyl are preferably prepared by reacting the unsubstituted hydantoin with an ethereal solution of diazomethane in tetrahydrofuran. The compounds in which X is nitro may, if desired, be reduced as previously described to form the corresponding compounds in which X is amino. The described process may be illustrated as follows:

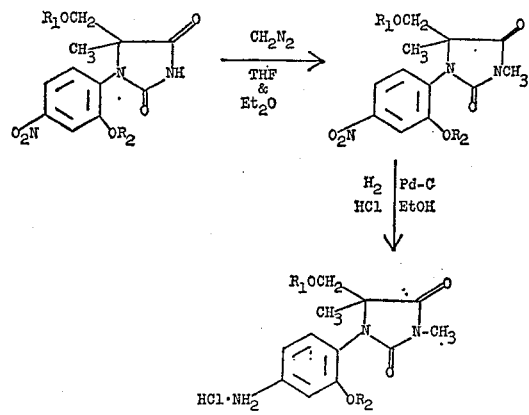

in which $R_1$ is as previously defined.

Representative of the compounds which may be prepared by the above described process are the following:

5-acetoxymethyl-1-(2-methoxy-4-nitrophenyl)-3,5-dimethylhydantoin,
5-acetoxymethyl-1-(2-methoxy-4-aminophenyl)-3,5-dimethylhydantoin,
5-hydroxymethyl-1-(2-methoxy-4-nitrophenyl)-3,5-dimethylhydantoin,
5-hydroxymethyl-1-(2-methoxy-4-aminophenyl)-3,5-dimethylhydantoin,
5-dimethylcarbamyloxymethyl-1-(2-methoxy-4-aminophenyl)-3,5-dimethylhydantoin,
5-benzoyloxymethyl-1-(2-methoxy-4-aminophenyl)-3,5-dimethylhydantoin,
5-acetoxymethyl-1-(2-ethoxy-4-aminophenyl)-3,5-dimethylhydantoin, and
5-hydroxymethyl-1-(2-isopropoxy-4-aminophenyl)-3,5-dimethylhydantoin.

The novel compounds of the present invention have been shown to possess the ability to affect the central nervous system of animals. In behavioral screening tests the compounds 5-hydroxymethyl-1-(2-methoxy-4-aminophenyl)-5-methylhydantoin and 5-acetoxymethyl-1-(2-methoxy-4-nitrophenyl) - 5 - methylhydantoin exhibited central nervous system activity. In mice receiving 100 to 1,000 mg./kg. of the compounds intraperitoneally in the form of a 5% aqueous solution there was demonstrated with the nitro compound a general central nervous system depression and with the amino compound a central nervous system stimulation. In addition, as a result of the tests the compounds were found to have $LD_{50}$'s in excess of 500 mg./kg. The tests were conducted in accordance with the procedure set forth by Irwin in "Animal and Clinical Pharmacologic Techniques in Drug Evaluation," J. H. Nodine and P. E. Siegler, Ed. Year Book Publishers, Inc., 1964, pp. 36–54.

The compound 5-hydroxymethyl-1-(2-methoxy-4-nitrophenyl)-5-methylhydantoin also exhibits antihypertensive properties as evidenced by its adrenergic neuron blocking activity. The adrenergic neuron blocking activity was demonstrated by the compound causing an increase in the latent period and a decrease in contraction height of muscle contractions elicited by electrical stimulation in the isolated vas deferens-hypogastric nerve preparation. Hukovic S. Brit. J. of Pharmacol., 1961, 16, pp. 188–194.

The compounds of the invention are preferably employed in combination with pharmaceutical diluents such as flavoring agents, disintegrating agents, and the like, in the form of unit dosage forms adapted for oral or parenteral administration. The compounds of the invention capable of forming salts are preferably employed in the form of their acid addition salts, especially the hydrohalide salts.

Unit dosage forms, such as tablets and capsules, may contain any suitable predetermined amount of one or more of the active compounds, preferably as a nontoxic acid addition salt. Such a unit dosage form should advisably contain between 5 and 150 mg. of the active agent. The total dose of the compound to be administered daily will normally not exceed 100 mg./kg. of body weight.

A typical tablet may have the following composition:

| | Mg. |
|---|---|
| (1) 5-hydroxymethyl - 1 - (2 - methoxy-4-aminophenyl)-5-methylhydantoin hydrochloride | 50 |
| (2) Starch U.S.P. | 35 |
| (3) Lactose U.S.P. | 50 |
| (4) Talc U.S.P. | 10 |
| (5) Stearic acid | 6 |

Powders (1), (2) and (3) are slugged, then granulated, mixed with (4) and (5) and tableted.

Capsules may be prepared by filling No. 3 hard gelatin capsules with the following ingredients:

| | Mg. |
|---|---|
| (1) 5-hydroxymethyl - 1 - (2 - methoxy-4-aminophenyl)-5-methylhydantoin hydrochloride | 50 |
| (2) Lactose U.S.P. | 170 |
| (3) Starch U.S.P. | 16 |
| (4) Talc U.S.P. | 8 |

Those compounds in which X is amino are also useful as intermediates in the preparation of pickling agents, moth-proofing agents and wood preservatives (see U.S. Pats. 2,425,320, 2,075,359 and 1,915,334).

The following examples illustrate the practice of the present invention:

EXAMPLE 1

1-(2-methoxy-4-nitrophenoxy)-2-propanone

A mixture of 4-nitroveratrole (183.2 g., 1 mole) and 448 g. (8 moles) of KOH in 4.5 liters of water is refluxed for 2 days, filtered, and cooled thoroughly. The resulting orange-red flakes are filtered and dried. One mole (207.2 g.) of this potassium salt and 116.7 g. (1.25 moles) of chloroacetone in 1.1 liters of acetone are refluxed for 24 hours, cooled, and filtered. The filtrate is evaporated, and the residual solid taken up in chloroform which was washed with water and with brine, dried, and evaporated. Recrystallization of the remaining tan powder from chloroform-petroleum ether provides 1-(2-methoxy-4-nitrophenoxy)-2-propanone as tan crystals, M.P. 112–115° (lit. M.P. 115–116°).

EXAMPLE 2

5 - hydroxymethyl - 1 - (2-methoxy-4-nitrophenyl)-5-methylhydantoin and 5-(2-methoxy-4-nitrophenoxy)methyl-5-methylhydantoin A solution of the ketone of Example 1 (22.5 g., 0.1 mole), $(NH_4)_2CO_3$ (57.7 g., 0.6 mole), and KCN (9.8 g., 0.15 mole) in 600 ml. of 50% aqueous ethanol is stirred and refluxed for 25 hours, concentrated under vacuum, and diluted with water. Acidification with concentrated HCl affords a yellow solid which is filtered and then stirred with 200 ml. of 5% NaOH at room temperature for 2 hours. The resulting mixture is filtered, and insoluble solids dissolved in warm water (350 ml.). This solution is filtered, cooled, and acidified with concentrated HCl. The solid thereby formed is isolated and recrystallized from aqueous DMF as cream-colored flakes, M.P. 265–267°. An analytical sample of 5-hydroxymethyl-1-(2-methoxy - 4 - nitrophenyl)-5-methylhydantoin melts at 265–266.5°.

*Analysis.*—Calcd. for $C_{12}H_{13}N_3O_6$ (percent): C, 48.81; H, 4.44; N, 14.24. Found (percent): C, 48.52; H, 4.55; N, 14.19.

Acidification of the 200 ml. of 5% NaOH filtrate with concentrated HCl provides 5-(2-methoxy-4-nitrophenoxy)methyl-5-methylhydantoin as a yellow powder, M.P. 180–184° with prior softening.

EXAMPLE 3

5-(2-methoxy-4-nitrophenoxy)methyl-5-methylhydantoin

A solution of the ketone of Example 1 (11.8 g., 0.05 mole), $(NH_4)_2CO_3$ (28.8 g., 0.3 mole) and KCN (3.6 g., 0.055 mole) in 300 ml. of 50% aqueous ethanol is refluxed gently for 6 hours, and then concentrated under vacuum. The residual solution is diluted with water (100 ml.) and acidified with concentrated HCl. The resulting solid is filtered and pulled nearly dry. Recrystallization from ethanol provides 5-(2-methoxy-4-nitrophenoxy)methylhydantoin as a yellow powder, M.P. 183–186°.

*Analysis.*—Calcd. for $C_{12}H_{13}N_3O_6$ (percent): C, 48.81; H, 4.44; N, 14.24. Found (percent): C, 48.84; H, 4.48; N, 14.18.

EXAMPLE 4

5-hydroxymethyl-1-(2-methoxy-4-nitrophenyl)-5-methylhydantoin

A solution of the compound of Example 3 (5.9 g., 0.02 mole), $(NH_4)_2CO_3$ (11.5 g., 0.12 mole), and KCN (1.3 g., 0.02 mole) in 120 ml. of 50% aqueous EtOH is refluxed for 24 hours, then concentrated, diluted with water and acidified. The resulting solid is heated with 50 ml. of ethanol, which is filtered of some insoluble material and cooled to give yellow granules, M.P. 181.5–183.5°.

The EtOH-insoluble solid is stirred with 20 ml. of 5% NaOH, and the insoluble material removed by filtration, dissolved in water, acidified, filtered and dried. The cream-colored flakes of 5-hydroxymethyl-1-(2-methoxy-4-nitrophenyl)-5-methylhydantoin melt at 265–267°.

EXAMPLE 5

5-acetoxymethyl-1-(2-methoxy-4-nitrophenyl)-5-methylhydantoin

To a cooled solution of the carbinol of Example 4 (8.85 g., 0.03 mole) in 60 ml. of pyridine is added dropwise 4.5 g., (0.06 mole) of acetyl chloride. The mixture is stirred for a day at room temperature, poured into ice-water, and scratched. The resulting solid is recrystallized from methanol in three crops to yield 5-acetoxymethyl-1-(2-methoxy-4-nitrophenyl)-5-methylhydantoin as a very pale yellow powder, M.P. 205–207°.

*Analysis.*—Calcd. for $C_{14}H_{15}N_3O_7$ (percent): C, 49.85; H, 4.49; N, 12.46. Found (percent): C, 50.22; H, 4.52; N, 12.49.

EXAMPLE 6

5-acetoxymethyl-1-(2-methoxy-4-nitrophenyl)-3,5-dimethylhydantoin

An ethereal solution of diazomethane is prepared from 1.8 g. (0.012 mole) of N-methyl-N'-nitro-N-nitrosoguanidine and 6 ml. of 40% aqueous KOH in 50 ml. of ether. The dried ether solution is added dropwise to a cooled suspension of the compound of Example 5 in 50 ml. of tetrahydrofuran. After stirring at room temperature for 16 hours, the resulting solution is evaporated to dryness. Recrystallization of the residual solid from chloroform-petroleum ether affords 5-acetoxymethyl-1-(2-methoxy-4-nitrophenyl)-3,5-dimethylhydantoin as a pale yellow, crystalline powder, M.P. 169–170.5°.

*Analysis.*—Calcd. for $C_{15}H_{17}N_3O_7$ (percent): C, 51.27; H, 4.88; N, 11.96. Found (percent): C, 50.85; H, 4.91; N, 11.92.

EXAMPLE 7

5-acetoxymethyl 1-(2-methoxy-4-aminophenyl)-3,5-dimethylhydantoin hydrochloride

A suspension of the nitro compound of Example 6 (6.65 g., 0.019 mole) and 0.5 g. of 10% palladium on carbon in 190 ml. of ethanol containing 1.6 ml. (0.019 mole) of concentrated HCl is treated with hydrogen at room temperature and 41.8 p.s.i. After 30 minutes, the catalyst is filtered and the filtrate evaporated. Crystallization of the residual gum from ethanolether furnishes 5 - acetoxymethyl - 1 - (2-methoxy-4-aminophenyl)-3,5-dimethylhydantoin hydrochloride as a cream-colored powder, M.P. 212.5–215°.

*Analysis.*—Calcd. for $C_{15}H_{20}ClN_3O_5$ (percent): C, 50.35; H, 5.63; N, 11.75. Found (percent): C, 50.30; H, 5.52; N, 11.84.

EXAMPLE 8

5-hydroxymethyl-1-(2-methoxy-4-aminophenyl)-5-methylhydantoin hydrochloride

A suspension of the nitro compound of Example 4 (8.85 g. 0.03 mole) of M.P. 265–267° and 0.8 g. of 10% palladium on carbon in 200 ml. of ethanol containing 2.5 ml. (0.03 mole) of concentrated HCl is treated with hydrogen at room temperature and 45 p.s.i. After 30 minutes the catalyst is removed by filtration, and the filtrate evaporated to dryness. Recrystallization of the solid residue from methanol-ether provides 5 - hydroxymethyl-1-(2-methoxy-4-aminophenyl)-5-methylhydantoin hydrochloride as a light tan powder, M.P. 272–274°.

*Analysis.*—Calcd. for $C_{12}H_{16}ClN_3O_4$ (percent): C, 47.76; H, 5.35; N, 13.93. Found (percent): C, 48.20; H, 5.37; N, 14.12.

EXAMPLE 9

5-hydroxymethyl-1-(2-methoxy-4-nitrophenyl)-3,5-dimethylhydantoin

A solution of diazomethane from 2.95 g. (0.02 mole) of the guanidine precursor in 60 ml. of ether is added dropwise to a cooled suspension of the carbinol of Example 4 (3 g., 0.01 mole) in 50 ml. of tetrahydrofuran. The reaction mixture is stirred at room temperature for 24 hours, let stand for an additional two days, and evaporated to dryness. Recrystallization of the remaining solid from chloroform-petroleum ether provides 5-hydroxymethyl-1-(2-methoxy-4-nitrophenyl)-3,5-dimethylhydantoin as a pale yellow powder, M.P. 194–196°.

*Analysis.*—Calcd. for $C_{13}H_{15}N_3O_6$ (percent): C, 50.48; H, 4.89; N, 13.59. Found (percent): C, 49.87; H, 5.27; N, 13.32.

EXAMPLE 10

5-hydroxymethyl-1-(2-methoxy-4-aminophenyl)-3,5-dimethylhydantoin hydrochloride The nitro compound of Example 9 (3.4 g., 0.011 mole) is reduced in the usual fashion. Crystallization of the initially isolated gum from ethanol-ether provides 5-hydroxymethyl - 1-(2-methoxy-4-aminophenyl)-3,5-dimethylhydantoin hydrochloride as a tan powder, M.P. 106–108° as a foam.

I claim:

1. A compound selected from compounds of the formula

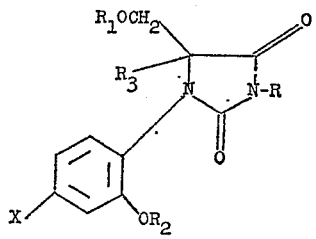

wherein X is nitro or $NH_2$, R is hydrogen, lower alkyl of 1 to 4 carbon atoms, benzyl, phenethyl and phenylisopropyl, $R_1$ is hydrogen or acetyl and $R_2$ and $R_3$ are lower alkyl of 1 to 4 carbon atoms.

2. A compound of claim 1 in which $R_1$ is hydrogen and R, $R_2$ and $R_3$ are methyl.

3. A compound of claim 1 in which $R_1$ is acetyl, R is hydrogen or lower alkyl and $R_2$ and $R_3$ are methyl.

4. A compound of claim 1 in which X is nitro.

5. A compound of claim 1 in which X is $NH_2$.

6. A compound of claim 1 in which X is nitro, R, $R_2$ and $R_3$ are methyl and $R_1$ is hydrogen or acetyl.

7. A compound of claim 1 in which X is $NH_2$, R, $R_2$ and $R_3$ are methyl and $R_1$ is hydrogen or acetyl.

References Cited

UNITED STATES PATENTS 3,213,104  10/1965  Cashin et al. _____ 260—309.5

FOREIGN PATENTS 1,341,483  9/1963  France _____ 260—309.5
38-19,986  9/1963  Japan _____ 260—309.5

OTHER REFERENCES

Bergmann et al., Chem. Abst., vol. 22, pp. 428–29 (1928).

Haas Chem. Abst., vol. 43, column 6308f (1949).

Marsili et al., J. Org. Chem., vol. 33, pp. 2884–7 (1968, July).

Noller Chemistry of Organic Compounds, 2nd ed., p. 161, Philadelphia, Saunders, 1957.

Sprinson et al., J. Biol. Chem., vol. 164, p. 427 relied on (1946).

NATALIE TROUSOF, Primary Examiner

U.S. Cl. X.R.

260—575, 590; 424—273